(12) United States Patent
Wang et al.

(10) Patent No.: US 8,556,178 B2
(45) Date of Patent: Oct. 15, 2013

(54) RFID DEVICES USING METAMATERIAL ANTENNAS

(75) Inventors: Ynjiun P. Wang, Cupertino, CA (US); Huyu Qu, San Jose, CA (US)

(73) Assignee: Hand Held Products, Inc., Fort Mill, SC (US)

( * ) Notice: Subject to any disclaimer, the term of this patent is extended or adjusted under 35 U.S.C. 154(b) by 0 days.

(21) Appl. No.: 13/041,165

(22) Filed: Mar. 4, 2011

(65) Prior Publication Data

US 2012/0223142 A1 Sep. 6, 2012

(51) Int. Cl.
*G02B 26/10* (2006.01)
*G06K 7/10* (2006.01)
*G06K 7/00* (2006.01)
*G06K 7/08* (2006.01)
*G06K 19/06* (2006.01)

(52) U.S. Cl.
USPC ...... 235/462.25; 235/439; 235/451; 235/492; 343/700 MS

(58) Field of Classification Search
USPC ........ 235/375, 451, 492, 439; 340/10.1, 10.2, 340/572.1, 572.2, 572.7; 343/700 MS, 343/700 R, 853
See application file for complete search history.

(56) References Cited

U.S. PATENT DOCUMENTS

| 5,945,938 | A | 8/1999 | Chia et al. |
| 6,992,628 | B2 | 1/2006 | Rawnick et al. |
| 7,068,234 | B2 | 6/2006 | Sievenpiper |
| 7,164,387 | B2 | 1/2007 | Sievenpiper |
| 7,403,161 | B2 | 7/2008 | DiNallo et al. |
| 7,486,242 | B2 | 2/2009 | Gala Gala et al. |
| 7,515,107 | B2 | 4/2009 | Saliga |

(Continued)

FOREIGN PATENT DOCUMENTS

| EP | 2207238 A1 | 7/2010 |
| WO | 2008083719 A1 | 7/2008 |
| WO | 2010013810 A1 | 2/2010 |

OTHER PUBLICATIONS

Aug. 7, 2012 Communication pursuant to Article 94(3) EPC in European Application No. 12 157 785.2-1248.

(Continued)

*Primary Examiner* — Tuyen K Vo
(74) *Attorney, Agent, or Firm* — Oliff & Berridge, PLC; R. Brian Drozd

(57) ABSTRACT

A radio frequency identifier (RFID) tag can comprise an RFID chip, an antenna, and a feed line electrically coupling the RFID chip to the antenna. An encoded information reading (EIR) terminal can comprise a microprocessor, a memory communicatively coupled to the microprocessor, a communication interface, and an EIR device provided by a bar code reading device, an RFID reading device, or a card reading device. The RFID reading device can further comprise an antenna and a feed line. The antenna for the RFID tag or for the RFID reading device can be provided by a patch cell, a patch cell array comprising two or more patch cells, or by a patch cell stack comprising two or more patch cells. An equivalent circuit for the patch can comprise at least two inductances and a shunt capacitance. An equivalent circuit for the patch cell array can comprise two or more inductance groups connected via a series capacitance and two or more shunt capacitances. An equivalent circuit for the patch cell stack can comprises two or more capacitances connected via a series inductance and two or more shunt inductances. The antenna can have a composite right- and left-handed (CRLH) structure.

24 Claims, 8 Drawing Sheets

(56) References Cited

U.S. PATENT DOCUMENTS

| | | |
|---|---|---|
| 7,592,957 B2 | 9/2009 | Achour et al. |
| 7,683,839 B2 | 3/2010 | Ollikainen et al. |
| 7,764,232 B2 | 7/2010 | Achour et al. |
| 7,855,696 B2 | 12/2010 | Gummalla et al. |
| 2003/0071126 A1 | 4/2003 | Waxelbaum |
| 2004/0217865 A1* | 11/2004 | Turner ...................... 340/572.7 |
| 2005/0225492 A1 | 10/2005 | Metz |
| 2007/0075903 A1 | 4/2007 | Matsugatani et al. |
| 2007/0161357 A1 | 7/2007 | Tudosoiu et al. |
| 2008/0001723 A1* | 1/2008 | Schuessler ................. 340/10.51 |
| 2008/0001843 A1 | 1/2008 | Wu et al. |
| 2008/0048917 A1 | 2/2008 | Achour et al. |
| 2008/0129626 A1 | 6/2008 | Wu et al. |
| 2008/0218417 A1* | 9/2008 | Gillette ................. 343/700 MS |
| 2008/0258981 A1* | 10/2008 | Achour et al. ................. 343/702 |
| 2008/0258993 A1 | 10/2008 | Gummalla et al. |
| 2009/0047745 A1 | 2/2009 | Magnera et al. |
| 2009/0051604 A1 | 2/2009 | Zhang et al. |
| 2009/0128446 A1 | 5/2009 | Gummalla et al. |
| 2009/0135087 A1* | 5/2009 | Gummalla et al. ........... 343/909 |
| 2009/0146820 A1* | 6/2009 | Kim et al. ................. 340/572.7 |
| 2009/0219213 A1 | 9/2009 | Lee et al. |
| 2009/0243813 A1* | 10/2009 | Smith et al. ................. 340/10.51 |
| 2009/0243940 A1* | 10/2009 | Humphrey ............. 343/700 MS |
| 2009/0245146 A1 | 10/2009 | Gummalla et al. |
| 2009/0251385 A1 | 10/2009 | Xu et al. |
| 2009/0289737 A1 | 11/2009 | Itoh et al. |
| 2009/0295473 A1 | 12/2009 | Dupuy et al. |
| 2009/0295660 A1 | 12/2009 | Xu et al. |
| 2009/0316612 A1 | 12/2009 | Poilasne et al. |
| 2010/0001921 A1* | 1/2010 | Copeland ...................... 343/876 |
| 2010/0045554 A1 | 2/2010 | Xu et al. |
| 2010/0053013 A1 | 3/2010 | Konishi et al. |
| 2010/0060544 A1 | 3/2010 | Penev et al. |
| 2010/0097281 A1 | 4/2010 | Wu et al. |
| 2010/0109955 A1 | 5/2010 | Anguera et al. |
| 2010/0109966 A1 | 5/2010 | Mateychuk et al. |
| 2010/0109971 A2* | 5/2010 | Gummalla et al. ........... 343/909 |
| 2010/0110943 A2 | 5/2010 | Gummalla at al. |
| 2010/0117908 A2 | 5/2010 | Lee et al. |
| 2010/0123635 A1 | 5/2010 | Lopez et al. |
| 2010/0157858 A1 | 6/2010 | Lee et al. |
| 2010/0214176 A1* | 8/2010 | Fixter et al. .............. 343/700 R |
| 2010/0231464 A1 | 9/2010 | Huang et al. |
| 2010/0231470 A1 | 9/2010 | Lee et al. |
| 2010/0238081 A1 | 9/2010 | Achour et al. |
| 2010/0283692 A1 | 11/2010 | Achour et al. |
| 2010/0283705 A1 | 11/2010 | Achour et al. |
| 2011/0026624 A1 | 2/2011 | Gummalla et al. |
| 2011/0039501 A1 | 2/2011 | Achour et al. |
| 2011/0168788 A1 | 7/2011 | Sonoda et al. |
| 2012/0074230 A1* | 3/2012 | Bernhard et al. ............. 235/492 |

OTHER PUBLICATIONS

Jul. 2, 2012 European Search Report in European Application No. 12/57785.2.

* cited by examiner

611a

611b

US 8,556,178 B2

RFID DEVICES USING METAMATERIAL ANTENNAS

FIELD OF THE INVENTION

The invention is generally related to RFID devices and is specifically related to RFID tags and RFID readers using metamaterial antennas.

BACKGROUND OF THE INVENTION

Radio frequency identification (RFID) methods are widely used in a number of applications, including smart cards, item tracking in manufacturing and retail, etc. An RFID tag can be attached, e.g., to a retail item. An encoded information reading (EIR) terminal deployed at the cashier's desk can be equipped with an RFID reader to read and/or modify the memory of an RFID tag attached to a retail item.

SUMMARY OF THE INVENTION

In one embodiment, there is provided a radio frequency identifier (RFID) tag comprising an RFID chip, an antenna, and a feed line electrically coupling the RFID chip to the antenna. The antenna can be provided by a patch cell array comprising one or more patch cells, or by a patch cell stack comprising two or more patch cells. An equivalent circuit for the patch cell array can comprise one or more inductance groups and one or more shunt capacitances. An equivalent circuit for the patch cell stack can comprises two or more capacitances connected via a series inductance, and two or more shunt inductances. The antenna can have a composite right- and left-handed (CRLH) structure.

In another embodiment, there is provided an encoded information reading (EIR) terminal comprising a microprocessor, a memory communicatively coupled to the microprocessor, a communication interface, and an EIR device provided by a bar code reading device, an RFID reading device, or a card reading device. The RFID reading device can further comprise an antenna provided by a patch cell array comprising one or more patch cells or by a patch cell stack comprising two or more patch cells. An equivalent circuit for the patch cell array can comprise one or more inductance groups and one or more shunt capacitances. An equivalent circuit for the patch cell stack can comprises two or more capacitances connected via a series inductance, and two or more shunt inductances. The antenna can have a composite right- and left-handed (CRLH) structure.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale, emphasis instead generally being placed upon illustrating the principles of the invention. In the drawings, like numerals are used to indicate like parts throughout the various views.

DETAILED DESCRIPTION OF THE INVENTION

Figure 1:
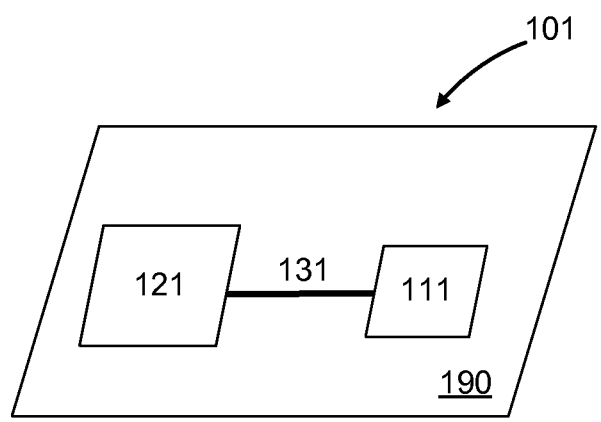
FIG. 1 depicts a schematic diagram of an RFID tag.

In one embodiment there is provided an RFID tag, schematically shown in FIG. 1. The RFID tag 101 can include an RFID chip 111 connected to an antenna 121 by a feed line 131. In one embodiment, feed line 131 can be provided by a monopole. In another embodiment feed line 131 can be provided by a micro metal stripe. In another embodiment feed line 131 can be provided by a coaxial cable. In a yet another embodiment, feed line 131 can be provided by a twin parallel wire. In a yet another embodiment, feed line 131 can be provided by a coplanar waveguide.

In another aspect, RFID chip 111 and antenna 121 can be disposed within a housing 190. In one embodiment, the housing can have a form factor designed to facilitate attaching the RFID tag 101 to an object to be tracked (not shown in FIG. 1). In another embodiment, RFID chip, antenna 121, and feed line 131 can be printed on a dielectric material.

In a further aspect, the physical dimension of an RFID tag can vary from several millimeters to several centimeters.

In one embodiment, antenna 121 of RFID tag 101 can receive a signal transmitted by an RFID reader (not shown in FIG. 1) and then can transmit a response signal to be received by the RFID reader. The response signal can contain useful data, e.g., a unique serial number of the RFID tag. In another embodiment, an RFID tag can constantly or periodically transmit a signal irrespectively of receiving a query signal from an RFID reader. In a yet another embodiment, an RFID tag can initiate communications with an RFID reader.

In one embodiment, RFID tag 101 can be equipped with a battery (not shown in FIG. 1) that can be used to provide power to the RFID tag's circuitry. In a further aspect, RFID tag 101 can include replaceable battery or can be provided as a sealed unit. In one embodiment, an RFID tag can be electrically connected to an external power source. An RFID tag equipped with a battery or connected to an external power source can be referred to as an active RFID tag.

In another embodiment, RFID tag 101 can be devoid of a battery and can receive power from an RFID reader. An RFID tag devoid of a battery can be referred to as a passive RFID tag. The antenna of a passive RFID tag can produce an electric current responsive to receiving a radio frequency (RF) signal transmitted by an RFID reader. The electric current produced by the antenna can be supplied to the tag's circuitry. In another embodiment, RFID tag 101 can receive one portion of its power from a battery, while receiving another portion of power from an external power source.

Using active RFID tags provides many advantages as compared to passive RFID tags. An active RFID tag can be read at larger distances as compared to passive RFID tags, which typically can be read only at very short distances (up to several feet). An active RFID tag can initiate communications with an RFID reader. Active RFID tags usually support higher data bandwidth as compared to passive RFID tags.

On the other hand, an active RFID tag cannot function without battery or external power. An active RFID tag is typically more expensive to manufacture. An active RFID tag is typically physically larger as compared to passive RFID tags.

In a further aspect, RFID tag 101 can be used in a number of applications, including smart cards, item tracking in manufacturing and retail, etc.

A smart card is an identification card (e.g., a credit card, a pass card) which does not need to be swiped or otherwise physically contacted by a card reader. This capability can be implemented by placing an RFID tag in the card.

Item tracking can be implemented by placing an RFID tag on each individual item. In retail, item tracking with RFID tags can be used in conjunction with other technologies such as bar code scanning and payment terminals. Item tracking with RFID tags can be used in loss prevention systems by placing an RFID tag into merchandise items and placing sensors at exit points. If an exit sensor detects a tagged item with a tag, which was not deactivated at the checkout, an alarm can go off.

In another aspect, RFID tag 101 can employ one or more signal modulation methods, including amplitude modulation, frequency modulation, phase modulation, amplitude shift keyed modulation (ASK), phase shift keyed modulation (PSK), and frequency shift keyed modulation (FSK). A skilled artisan would appreciate the fact that other modulation methods are within the spirit and the scope of the invention.

In amplitude and ASK modulation schemes, the information to be transmitted by an RFID tag is encoded by changes in the amplitude of the carrier wave. In a frequency modulation scheme, the information to be transmitted by an RFID tag is encoded by changes in the frequency of the carrier wave sent. In an FSKM modulation scheme, the information to be transmitted by an RFID tag is encoded by changes between two or more frequencies of the carrier wave. In phase and PSK modulation schemes, the information to be transmitted by an RFID tag is encoded by changes in the phase of the carrier wave.

In one embodiment, an RFID tag can transform and transmit back the carrier wave transmitted by an RFID reader. In another embodiment, an RFID tag can produce its own carrier wave.

In another aspect, RFID tag 101 can encode the information to be transmitted (payload) using an error correction protocol. In one embodiment, an error correcting code can be calculated based on the payload content, and appended to the payload by the RFID tag. An RFID reader can apply the same error correction protocol to the payload and compare the resulting calculated error correction code value with the error correction code value received as part of the transmission. If the two values match, the data has been received correctly. Otherwise, another read operation can be attempted.

In another aspect, the information in RFID tag 101 can be programmed during the manufacturing process (factory programming, typically producing a read-only RFID tag) or after the manufacturing process has been completed (field programming). In a further aspect, the information in RFID tag 101 can be updated dynamically when the tag is in operation.

In a further aspect, RFID tag 101 can have memory available to store the information. In one embodiment, RFID tag 101 can include a non-volatile memory which retains information without the need to electrically power the memory device. In another embodiment, RFID tag 101 can include both read-only and programmable memory. The read-only memory can be used, e.g., to store the tag's unique serial number. In one embodiment, the memory can be provided as an integral part of the RFID chip 111.

In a further aspect, the RFID chip 111 can comprise a memory and an RF front end. The RF front end can be used to convert high frequency RF signals to/from base-band or intermediate frequency signals.

In another aspect, an RFID tag can be devoid of the RFID chip 111. A chipless RFID tag can reflect back a modified portion of an RFID signal transmitted by an RFID reader. The information in a chipless RFID tag can be encoded by the method of modifying the received RF signal before reflecting it back to the reader.

In another aspect, the distance at which an RFID tag can be read (the read range) can be affected by a number of factors, including the signal frequency, the antenna gain, antenna radiation pattern, the orientation and polarization of the RFID reader antenna and the RFID tag antenna.

In one embodiment, the antenna 121 of FIG. 1 can be made of a metamaterial (MTM). Metamaterials are artificial composite materials engineered to produce a desired electromagnetic behavior which surpasses that of natural materials. MTM-based objects can include structures which are much smaller than the wavelength of electromagnetic waves propagating through the material. MTM technology advantageously allows for precise control of the propagation of electromagnetic waves in the confines of small structures by determining the values of operating parameters which can include operating frequency, bandwidth, phase offsets, constant phase propagation, matching conditions, and number and positioning of ports.

In one aspect, an MTM antenna can be physically small as compared to other types of antennas: an MTM antenna can be sized, for example, on the order of one tenths of a signal's wavelength, while providing performance equal to or better than an antenna made of a conventional material and sized on the order of one half of the signal's wavelength. Thus, for a frequency range of 860 MHz-930 MHz, an antenna made of a conventional material should have the size of approximately 165 mm for a dipole antenna (or 82.5 mm for a monopole antenna), while a MTM antenna can have a size of 33 mm.

The ability of an MTM antenna to produce a desired electromagnetic behavior can be explained by the fact that while most natural materials are right-handed (RH) materials (i.e. propagation of electromagnetic waves in natural materials follows the right-hand rule for the trio (E, H, $\beta$), where E is the electrical field, H is the magnetic field, and $\beta$ is the phase velocity) exhibiting a positive refractive index, a metamaterial due to its artificial structure can exhibit a negative refractive index and follow the left-hand rule for the trio (E, H, $\beta$). A metamaterial exhibiting a negative refractive index can be a pure left-handed (LH) metamaterial by simultaneously having negative permittivity and permeability. A metamaterial can combine RH and LH features (Composite Right and Left Handed (CRLH) materials). In one embodiment, the antenna 121 of FIG. 1 can have a Composite Right and Left Handed (CRLH) structure.

Figure 2:
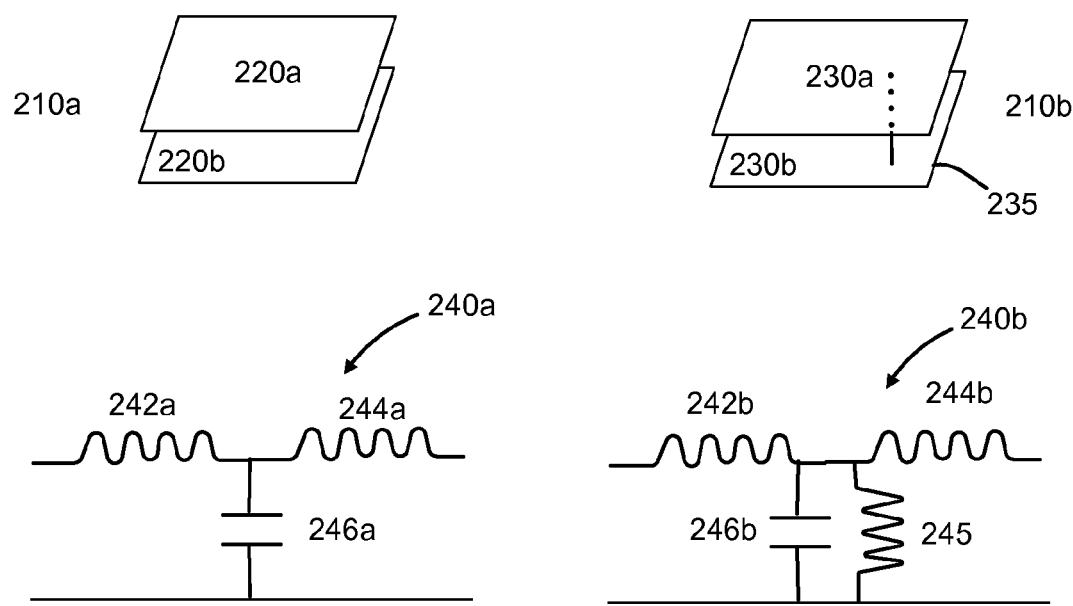
FIGS. 2-4 depicts schematic diagrams and equivalent circuit diagrams of various embodiments of antennas that can be used with an RFID tag or with an RFID reading device.

In one embodiment, an RFID tag 101 of FIG. 1 can comprise an antenna 121 provided by a patch cell 210a, 210b (best viewed in FIG. 2). A patch cell 210a can further comprise a metal patch 220a suspended over the ground plane 220b. An equivalent circuit diagram 240a can include a combination of series inductance 242a, 244a and a shunt capacitance 246a.

In another embodiment, a patch cell 210b can further comprise a metal patch 230a connected to the ground plane 230b through a via 235. In one embodiment, the diameter of the via can be adjustable depending on the required antenna parameters. An equivalent circuit diagram 240b can include a combination of series inductance 242b, 244b, a shunt inductance 245, and a shunt capacitance 246b.

Figure 3:
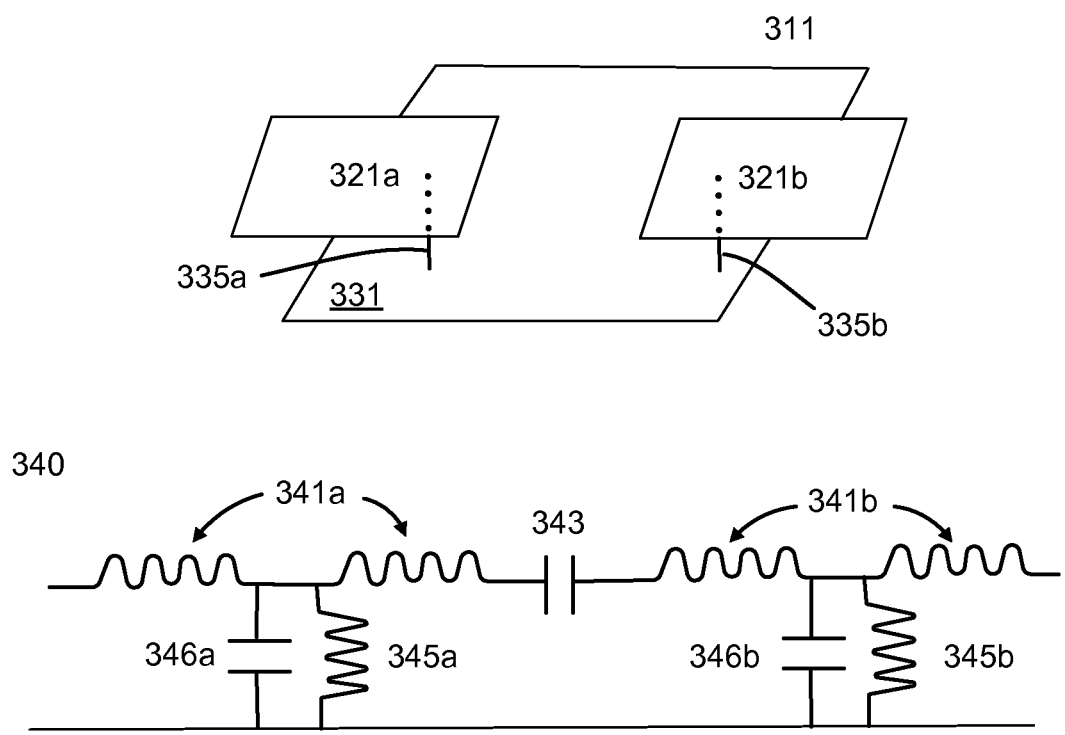

In another embodiment, the antenna 121 of FIG. 1 can comprise a patch cell array 311 (best viewed in FIG. 3) including two or more 1-D or 2-D patch cells 321a, 321b disposed horizontally in a plane parallel to the patches. Each top patch of the cell can be connected to a ground plane 331 through a via 335a, 335b. An equivalent circuit diagram 340 can include two or more inductance groups 341a, 341b. Each inductance group 341a, 341b can comprise two or more inductances connected in series. The inductance groups 341a, 341b can be connected in series with a capacitance 343. The equivalent circuit diagram 340 can further comprise two or more shunt capacitances 346a, 346b. The equivalent circuit diagram 340 can further comprise two or more shunt inductances 345a, 345b.

Figure 4:
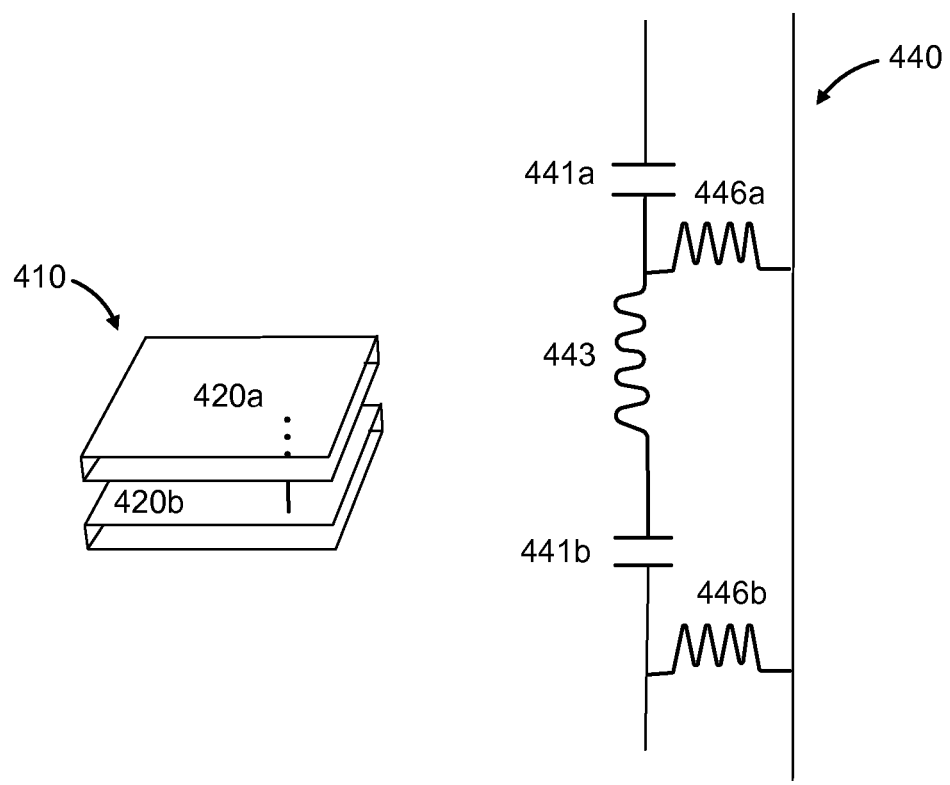

In a yet another embodiment, antenna 121 of FIG. 1 can comprise a patch cell stack 410 (best viewed in FIG. 4) including two or more 1-D or 2-D patch cells 420a, 420b disposed vertically in a plane perpendicular to the patches. The bottom patch of each cell can be connected to a ground plane. An equivalent circuit diagram 440 can include two or more capacitances 441a, 441b connected in series with an inductance 443. The equivalent circuit diagram 440 can further comprise two or more shunt inductances 446a, 446b.

In another aspect, the antenna gain (i.e., the relation of the intensity of an antenna in a given direction to the intensity that would be produced by a hypothetical ideal antenna that radiates equally in all directions and has no losses) can increase with increasing the number of the patch cells.

While the size of a patch cell made of a conventional material can be approximately one-half of the signal wavelength, the size of a patch cell made of a metamaterial can be reduced to approximately one-tenth of the signal wavelength. Electromagnetic metamaterials can be synthesized by embedding various constituents with novel geometric shapes such as transmission line and split ring resonator into some host media.

Figure 5:
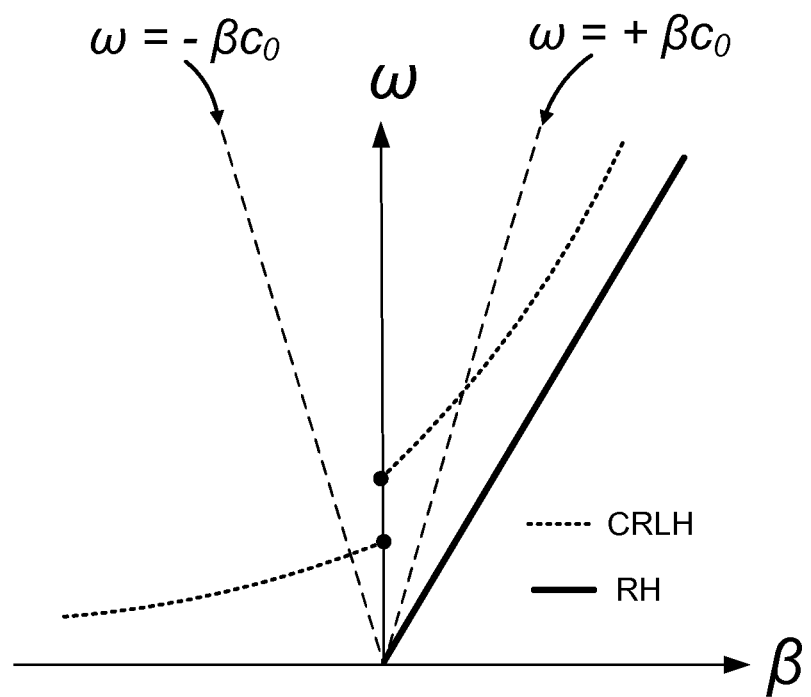
FIG. 5 depicts am example of a graph of a composite left/right-handed phase constant.

A transmission line can combine series capacitance ($C_L$) and shunted inductance ($L_L$), and can have the left-hand properties which can support backward wave with propagation phase constant. Since pure left-hand transmission line does not exist due to parasitic right-hand capacitors ($C_R$) and inductors ($L_R$) occurring in fabrication processes, a realizable transmission line approach can be a Composite Right/Left-hand (CRLH) transmission line with propagation phase constant β shown in FIG. 5. At low frequencies a CRLH transmission line can support a backward wave showing left-hand properties, while at high frequencies it can support a forward wave showing right-hand properties. A CRLH transmission line can exhibit properties not dependant upon resonance, and can have low loss and broad band performance.

A split ring resonator (SRR) can be provided by a nonmagnetic conducting unit made of metal like copper. In one embodiment, a SRR can be provided by a pair of concentric annular rings separated by a small gap, with splits in them at opposite ends. A magnetic flux penetrating the metal rings can induce rotating currents in the rings, which can produce their own flux to enhance or oppose the incident field. Because of the splits in the rings, the structure can support resonant wavelengths much larger than the diameter of the rings. The small gaps between the rings can produce large capacitance values which lower the resonating frequency, therefore the dimensions of the structure can be small compared to the resonant wavelength. The resonance frequency of a SRR can depend on its geometrical parameters.

Figure 6:
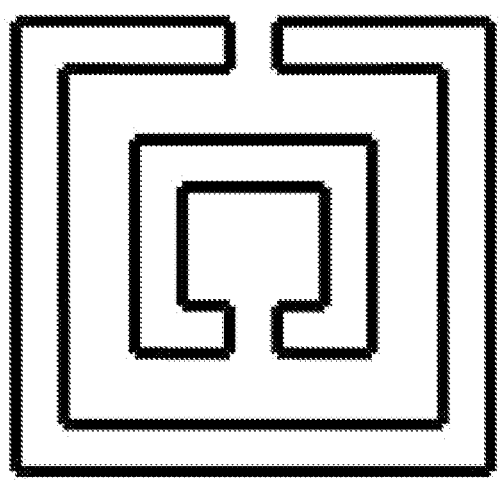
FIG. 6 depicts examples of nested split ring resonators.
Figure 6:
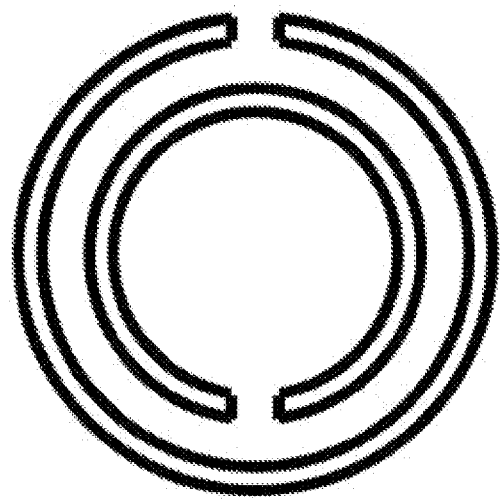

An SRR can be provided in one of a variety form factors, including rod split rings, nested split rings, single split rings, deformed split-rings, spiral split rings, extended S-structures, etc. FIG. 6 depicts two examples of nested split ring resonators 610a, 610b.

In another aspect, antenna 121 of FIG. 1 can support two or more operational frequency bands tailored to specific applications and not limited to harmonic frequency multiples. A frequency band can be characterized by its central frequency. In one embodiment, the size of antenna 121 of FIG. 1 can be less than or equal to one tenth of a maximum of the center frequencies for the frequency bands supported by the antenna.

In a further aspect, an MTM-based component (e.g., a broadband matching circuit, a phase-shifting component, or a transmission line) can preserve phase linearity over frequency ranges which are five to ten times greater than those provided by components made of conventional materials.

Figure 7:
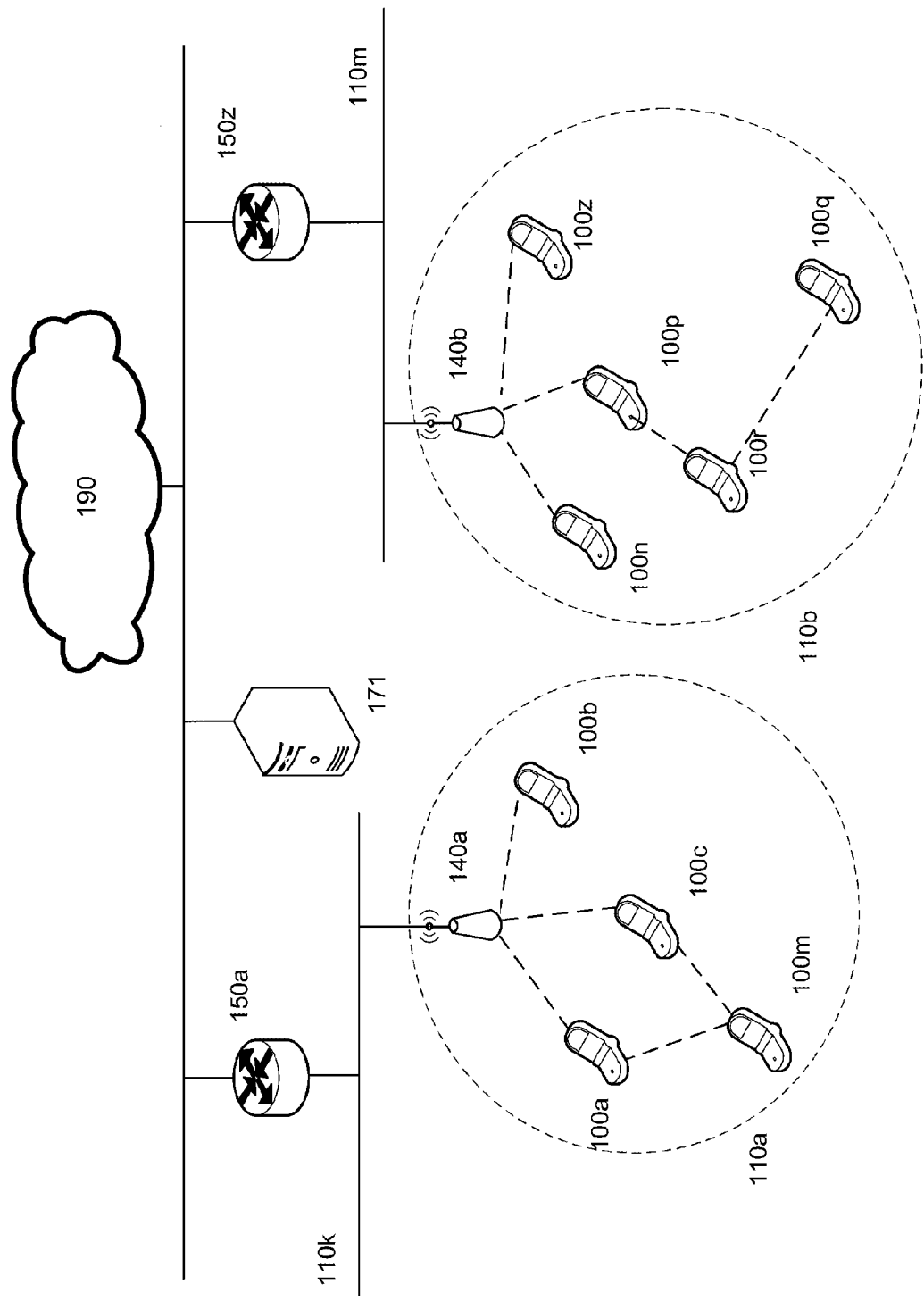
FIG. 7 depicts a network-level layout of a data collection system utilizing EIR terminals.

In another embodiment, there is provided an encoded information reading (EIR) terminal for incorporation in a data collection system. The data collection system, schematically shown in FIG. 7, can include a plurality of EIR terminals 100a-100z in communication with a plurality of interconnected networks 110a-110z. In one aspect, the plurality of networks 110a-110z can include at least one wireless communication network.

In a further aspect, an EIR terminal can comprise a communication interface which can be used by the terminal to connect to one or more networks 110a-110z. In one embodiment, the communication interface can be provided by a wireless communication interface.

The EIR terminal 100c can establish a communication session with the host computer 171. In one embodiment, network frames can be exchanged by the EIR terminal 100c and the host computer 171 via one or more routers, base stations, and other infrastructure elements. In another embodiment, the host computer 171 can be reachable by the EIR terminal 100c via a local area network (LAN). In a yet another embodiment, the host computer 171 can be reachable by the EIR terminal 100c via a wide area network (WAN). A skilled artisan would appreciate the fact that other methods of providing interconnectivity between the EIR terminal 100c and the host computer 171 relying upon LANs, WANs, virtual private networks (VPNs), and/or other types of network are within the spirit and the scope of the invention.

In one embodiment, the communications between the EIR terminal 100c and the host computer 171 can comprise a series of HTTP requests and responses transmitted over one or more TCP connections. In one embodiment, the communications between the EIR terminal 100c and the host computer 171 can comprise VoIP traffic transmitted over one or more TCP and/or UDP ports. A skilled artisan would appreciate the fact that using other transport and application level protocols is within the scope and the spirit of the invention.

In one aspect, at least one of the messages transmitted by the EIR terminal can include decoded message data corresponding to, e.g., a bar code label or an RFID label attached to a product or to a shipment item. For example, an EIR terminal can transmit a request to the host computer to retrieve product information corresponding to a product identifier encoded by a bar code label attached to the product, or to transmit an item tacking record for an item identified by a bar code label attached to the product.

Figure 8:
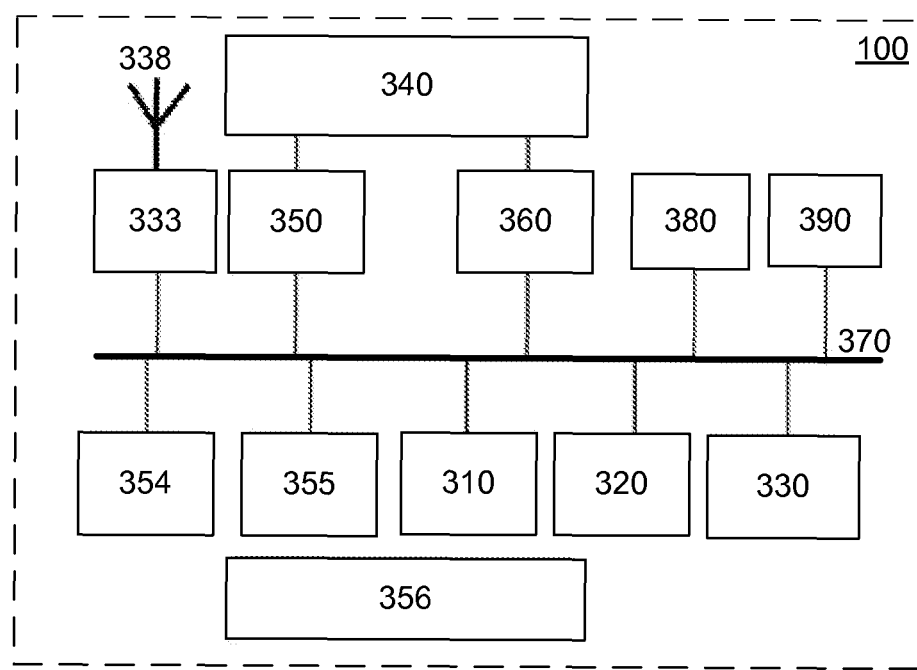
FIG. 8 depicts component-level layout of an EIR terminal.

In another aspect, the EIR terminal 100 can further comprise at least one microprocessor 310 and a memory 320, both coupled to the system bus 370, as best viewed in FIG. 8. The microprocessor 310 can be provided by a general purpose microprocessor or by a specialized microprocessor (e.g., an ASIC). In one embodiment, the EIR terminal 100 can comprise a single microprocessor which can be referred to as a central processing unit (CPU). In another embodiment, the EIR terminal 100 can comprise two or more microprocessors, for example a CPU and a specialized microprocessor (e.g., an ASIC). In one embodiment, the memory 320 can be provided by RAM, ROM, EPROM, and/or SIM card-based memory.

The EIR terminal 100 can further comprise one or more encoded information reading (EIR) devices 330, including a bar code reading device, an RFID reading device, and a card reading device, also coupled to the system bus 370. In one embodiment, an EIR reading device can be capable of outputting decoded message data corresponding to an encoded message. In another embodiment, the EIR reading device can output raw message data comprising an encoded message, e.g., raw image data or raw RFID data.

Of course, devices that read bar codes, read RFID, or read cards bearing encoded information may read more than one of these categories while remaining within the scope of the invention. For example, a device that reads bar codes may include a card reader, and/or RFID reader; a device that reads RFID may also be able to read bar codes and/or cards; and a device that reads cards may be able to also read bar codes and/or RFID. For further clarity, it is not necessary that a device's primary function involve any of these functions in order to be considered such a device; for example, a cellular telephone, smartphone, or PDA that is capable of reading bar codes is a device that read bar codes for purposes of the present invention The EIR terminal 100 can further comprise a keyboard interface 354, a display adapter 355, both also coupled to the system bus 370. The EIR terminal 100 can further comprise a battery 356.

In one embodiment, the EIR terminal 100 can further comprise a GPS receiver 380. In one embodiment, the EIR terminal 100 can further comprise at least one connector 390 configured to receive a subscriber identity module (SIM) card.

As noted herein supra, in one embodiment, EIR terminal 100 can comprise an RFID reading device 333. In a further aspect, the RFID reading device can comprise an antenna 338.

In one embodiment, the antenna 338 of FIG. 8 can have a Composite Right and Left Handed (CRLH) structure.

In one embodiment, the antenna 338 of FIG. 8 can be provided by a patch cell 210 (best viewed in FIG. 2). A patch cell 210a can further comprise a metal patch 220a suspended over the ground plane 220b. An equivalent circuit diagram 240a can include a combination of series inductance 242a, 244a and a shunt capacitance 246a.

In another embodiment, a patch cell 210b can further comprise a metal patch 230a connected to the ground plane 230b through a via 235. In one embodiment, the diameter of the via can be adjustable depending on the required antenna parameters. An equivalent circuit diagram 240b can include a combination of series inductance 242b, 244b, a shunt inductance 245, and a shunt capacitance 246b.

In another embodiment, the antenna 338 of FIG. 8 can comprise a patch cell array 311 (best viewed in FIG. 3) including two or more 1-D or 2-D patch cells 321a, 321b disposed horizontally in a plane parallel to the patches. Each top patch of the cell can be connected to a ground plane 331 through a via 335a, 335b. An equivalent circuit diagram 340 can include two or more inductance groups 341a, 341b. Each inductance group 341a, 341b can comprise two or more inductances connected in series. The inductance groups 341a, 341b can be connected in series with a capacitance 343. The equivalent circuit diagram 340 can further comprise two or more shunt capacitances 346a, 346b. The equivalent circuit diagram 340 can further comprise two or more shunt inductances 345a, 345b.

In another embodiment, the antenna 338 of FIG. 8 can comprise a patch cell stack 410 (best viewed in FIG. 4) including two or more 1-D or 2-D patch cells 420a, 420b disposed vertically in a plane perpendicular to the patches. The bottom patch of each cell can be connected to a ground plane. An equivalent circuit diagram 440 can include two or more capacitances 441a, 441b connected in series with an inductance 443. The equivalent circuit diagram 440 can further comprise two or more shunt inductances 446a, 446b.

In another aspect, the gain of the antenna 338 of FIG. 8 (i.e., the relation of the intensity of an antenna in a given direction to the intensity that would be produced by a hypothetical ideal antenna that radiates equally in all directions and has no losses) can increase with increasing the number of the patch cells.

In another aspect, antenna 338 of FIG. 8 can support two or more operational frequency bands tailored to specific applications and not limited to harmonic frequency multiples. A frequency band can be characterized by its central frequency. In one embodiment, the size of antenna 121 of FIG. 1 can be less than or equal to one tenth of a maximum of the center frequencies for the frequency bands supported by the antenna.

While the present invention has been particularly shown and described with reference to certain exemplary embodiments, it will be understood by one skilled in the art that various changes in detail may be affected therein without departing from the spirit and scope of the invention as defined by claims that can be supported by the written description and drawings. Further, where exemplary embodiments are described with reference to a certain number of elements it will be understood that the exemplary embodiments can be practiced utilizing less than the certain number of elements.

A small sample of systems methods and apparatus that are described herein is as follows:

A1. A radio frequency identifier (RFID) tag comprising:
   an RFID chip;
   an antenna provided by at least one of: a patch cell array comprising one or more patch cells, a patch cell stack comprising two or more patch cells;
   a feed line electrically coupling said RFID chip to said antenna;
   wherein an equivalent circuit for said patch cell array comprises:
      at least one inductance group comprising at least two series inductances;
      at least one shunt capacitance;
   wherein an equivalent circuit for said patch cell stack comprises:
      at least two capacitances connected via a series inductance;
      at least two shunt inductances; and
   wherein said antenna has a composite right- and left-handed (CRLH) structure.

A2. The RFID tag of A1, wherein said equivalent circuit for said patch cell array further comprises one or more shunt inductances.

A3. The RFID tag of A1, wherein said RFID chip comprises a radio frequency (RF) front end and a memory.

A4. The RFID tag of A1, wherein said antenna is configured to support one or more frequency bands.

A5. The RFID tag of A1, wherein said antenna is configured to support one of more frequency bands, each frequency band of said one or more frequency bands having a center frequency; and
   wherein said antenna has a size of less or equal to one tenth of a maximum of said center frequencies.

A6. The RFID tag of A1, wherein said feed line is provided by one of: a monopole, a micro metal stripe, a coaxial cable, a twin parallel wire, a coplanar waveguide.

A7. The RFID tag of A1, further comprising a battery.

A8. The RFID tag of A1, wherein said patch cell array comprises two or more patch cells;

wherein said at least one inductance group is provided by two or more inductance groups connected via a series capacitance; and wherein said at least one shunt capacitance is provided by two or more shunt capacitances.

A9. The RFID tag of A8, wherein said antenna has a gain, said gain increasing with increasing the number of said patch cells.

A10. The RFID tag of A8, wherein each patch cell of said two or more patch cells further comprises a patch suspended over a ground plane.

A11. The RFID tag of A8, wherein each patch cell of said two or more patch cells further comprises a patch electrically coupled to a ground plane.

A12. The RFID tag of A8, wherein said patch cell array comprises two or more patches electrically coupled to a ground plane.

B1. An encoded information reading (EIR) terminal comprising:
    a microprocessor;
    a memory communicatively coupled to said microprocessor;
    an EIR device selected from the group consisting of: a bar code reading device, an RFID reading device, and a card reading device, said EIR device configured to perform at least one of: outputting raw message data comprising an encoded message and outputting decoded message data corresponding to an encoded message;
    a communication interface;
    wherein said RFID reading device further comprises an antenna provided by at least one of: a patch cell array comprising one or more patch cells, a patch cell stack comprising two or more patch cells;
    wherein an equivalent circuit for said patch cell array comprises:
        at least one inductance group comprising at least two series inductances;
        at least one shunt capacitance;
    wherein an equivalent circuit for said patch cell stack comprises:
        at least two capacitances connected via a series inductance;
        at least two shunt inductances; and
    wherein said antenna has a composite right- and left-handed (CRLH) structure.

B2. The encoded information reading (EIR) terminal of B1, wherein said equivalent circuit for said patch cell array further comprises one or more shunt inductances.

B3. The encoded information reading (EIR) terminal of B1, wherein said antenna is configured to support one or more frequency bands.

B4. The encoded information reading (EIR) terminal of B1, wherein said antenna is configured to support one of more frequency bands, each frequency band of said one or more frequency bands having a center frequency; and
    wherein said antenna has a size of less or equal to one tenth of a maximum of said center frequencies.

B5. The encoded information reading (EIR) terminal of B1, wherein said feed line is provided by one of: a monopole, a micro metal stripe, a coaxial cable, a twin parallel wire, a coplanar waveguide.

B6. The encoded information reading (EIR) terminal of B1, wherein said patch cell array comprises two or more patch cells;
    wherein said at least one inductance group is provided by two or more inductance groups connected via a series capacitance; and
    wherein said at least one shunt capacitance is provided by two or more shunt capacitances.

B7. The encoded information reading (EIR) terminal of B6, wherein said antenna has a gain, said gain increasing with increasing the number of said patch cells.

B8. The encoded information reading (EIR) terminal of B6, wherein each patch cell of said two or more patch cells further comprises a patch suspended over a ground plane.

B9. The encoded information reading (EIR) terminal of B6, wherein each patch cell of said two or more patch cells further comprises a patch electrically coupled to a ground plane.

B10. The encoded information reading (EIR) terminal of B6, wherein said patch cell array comprises two or more patches electrically coupled to a ground plane.

The invention claimed is:

1. A radio frequency identifier (RFID) tag comprising:
    an RFID chip;
    an antenna provided by a patch cell stack comprising two or more patch cells, wherein said antenna is configured to support one or more frequency bands, each frequency band of said one or more frequency bands having a center frequency, and wherein said antenna has a size of less or equal to one tenth of a maximum of said center frequencies; and
    a feed line electrically coupling said RFID chip to said antenna;
    wherein an equivalent circuit for said patch cell stack comprises:
        at least two capacitances, each of the at least two capacitances connected to each additional capacitance of the at least two capacitances via a series inductance;
        at least two shunt inductances; and
    wherein said antenna has a composite right-and left-handed (CRLH) structure.

2. The RFID tag of claim 1, wherein said RFID chip comprises a radio frequency (RF) front end and a memory.

3. The RFID tag of claim 1, wherein said antenna is configured to support one or more frequency bands.

4. The RFID tag of claim 1, wherein said feed line is provided by one of: a monopole, a micro metal stripe, a coaxial cable, a twin parallel wire, a coplanar waveguide.

5. The RFID tag of claim 1, further comprising a battery.

6. The RFID tag of claim 1, wherein said patch cell stack includes two or more patch cells disposed vertically in a plane perpendicular to said patch cells.

7. An encoded information reading (EIR) terminal comprising:
    a microprocessor;
    a memory communicatively coupled to said microprocessor; and
    an EIR device comprising an RFID reading device, said EIR device configured to perform at least one of: outputting raw message data comprising an encoded message and outputting decoded message data corresponding to an encoded message;
    a communication interface;
    wherein said RFID reading device further comprises an antenna provided by a patch cell stack comprising two or more patch cells
    wherein said antenna is configured to support one or more frequency bands, each frequency band of said one or more frequency bands having a center frequency,
    wherein said antenna has a size of less or equal to one tenth of a wavelength corresponding to a maximum of said center frequencies;

wherein an equivalent circuit for said patch cell stack comprises:
at least two capacitances, each of the at least two capacitances connected to each additional capacitance of the at least two capacitances via a series inductance; and
at least two shunt inductances; and
wherein said antenna has a composite right-and left-handed (CRLH) structure.

8. The encoded information reading (EIR) terminal of claim 7, wherein said antenna is configured to support one or more frequency bands.

9. The encoded information reading (EIR) terminal of claim 7, wherein said feed line is provided by one of: a monopole, a micro metal stripe, a coaxial cable, a twin parallel wire, a coplanar waveguide.

10. The EIR terminal of claim 7, wherein said patch cell stack includes two or more patch cells disposed vertically in a plane perpendicular to said patch cells.

11. A radio frequency identifier (RFID) tag comprising:
an RFID chip;
an antenna provided a patch cell array comprising one or more patch cells;
a feed line electrically coupling said RFID chip to said antenna;
wherein an equivalent circuit for said patch cell array comprises:
at least one inductance group comprising at least two series inductances;
at least one shunt capacitance;
wherein said antenna has a composite right-and left-handed (CRLH) structure;
wherein said antenna is configured to support one or more frequency bands, each frequency band of said one or more frequency bands having a center frequency; and
wherein said antenna has a size of less or equal to one tenth of a wavelength corresponding to a maximum of said center frequencies.

12. The RFID tag of claim 11, wherein said equivalent circuit for said patch cell array further comprises one or more shunt inductances.

13. The RFID tag of claim 11, wherein said patch cell array comprises two or more patch cells;
wherein said at least one inductance group is provided by two or more inductance groups connected via a series capacitance; and
wherein said at least one shunt capacitance is provided by two or more shunt capacitances.

14. The RFID tag of claim 13, wherein said antenna has a gain, said gain increasing with increasing the number of said patch cells.

15. The RFID tag of claim 13, wherein each patch cell of said two or more patch cells further comprises a patch suspended over a ground plane.

16. The RFID tag of claim 13, wherein each patch cell of said two or more patch cells further comprises a patch electrically coupled to a ground plane.

17. The RFID tag of claim 13, wherein said patch cell array comprises two or more patches electrically coupled to a ground plane.

18. An encoded information reading (EIR) terminal comprising:
a microprocessor;
a memory communicatively coupled to said microprocessor;
an EIR device selected from the group consisting of: a bar code reading device, an RFID reading device, and a card reading device, said EIR device configured to perform at least one of: outputting raw message data comprising an encoded message and outputting decoded message data corresponding to an encoded message;
a communication interface;
wherein said RFID reading device further comprises an antenna provided by a patch cell array comprising one or more patch cells;
wherein an equivalent circuit for said patch cell array comprises:
at least one inductance group comprising at least two series inductances;
at least one shunt capacitance;
wherein said antenna has a composite right-and left-handed (CRLH) structure;
wherein said antenna is configured to support one or more frequency bands, each frequency band of said one or more frequency bands having a center frequency; and
wherein said antenna has a size of less or equal to one tenth of a wavelength corresponding to a maximum of said center frequencies.

19. The encoded information reading (EIR) terminal of claim 18, wherein said equivalent circuit for said patch cell array further comprises one or more shunt inductances.

20. The encoded information reading (EIR) terminal of claim 18, wherein said patch cell array comprises two or more patch cells;
wherein said at least one inductance group is provided by two or more inductance groups connected via a series capacitance; and
wherein said at least one shunt capacitance is provided by two or more shunt capacitances.

21. The encoded information reading (EIR) terminal of claim 20, wherein said antenna has a gain, said gain increasing with increasing the number of said patch cells.

22. The encoded information reading (EIR) terminal of claim 20, wherein each patch cell of said two or more patch cells further comprises a patch suspended over a ground plane.

23. The encoded information reading (EIR) terminal of claim 20, wherein each patch cell of said two or more patch cells further comprises a patch electrically coupled to a ground plane.

24. The encoded information reading (EIR) terminal of claim 20, wherein said patch cell array comprises two or more patches electrically coupled to a ground plane.

* * * * *